(12) United States Patent
Nagasawa et al.

(10) Patent No.: US 10,083,612 B2
(45) Date of Patent: Sep. 25, 2018

(54) DISPLAY DEVICE FOR VEHICLE

(71) Applicant: SUBARU CORPORATION, Tokyo (JP)

(72) Inventors: Isamu Nagasawa, Tokyo (JP); Toshiya Furukawa, Tokyo (JP); Tsukasa Mikuni, Tokyo (JP); Takahiro Sakaguchi, Tokyo (JP); Shun Ichikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/642,163

(22) Filed: Jul. 5, 2017

(65) Prior Publication Data

US 2018/0061234 A1 Mar. 1, 2018

(30) Foreign Application Priority Data

Aug. 25, 2016 (JP) .................................. 2016-164556

(51) Int. Cl.
*G08G 1/16* (2006.01)
*G06K 9/00* (2006.01)

(52) U.S. Cl.
CPC ............ *G08G 1/16* (2013.01); *G06K 9/00805* (2013.01); *B60K 2350/1084* (2013.01); *B60K 2350/2052* (2013.01)

(58) Field of Classification Search
CPC .......... G08G 1/16; G08G 1/162; G08G 1/163; G08G 1/164; G08G 1/165; G08G 1/166;

(Continued)

(56) References Cited

U.S. PATENT DOCUMENTS 6,654,670 B2 * 11/2003 Kakinami .............. B60Q 9/005
348/119
7,024,286 B2 * 4/2006 Kimura ................ B62D 15/028
348/119

(Continued)

FOREIGN PATENT DOCUMENTS

| JP | 2003-291688 A | 10/2003 |
|---|---|---|
| JP | 2007-263839 A | 10/2007 |
| JP | 2015-225366 A | 12/2015 |

OTHER PUBLICATIONS

Japanese Office Action, dated Jan. 30, 2018, in Japanese Application No. 2016-164556 and English Translation thereof.

*Primary Examiner* — Van Trieu
(74) *Attorney, Agent, or Firm* — McGinn I. P. Law Group, PLLC.

(57) ABSTRACT

Provided is a display device for a vehicle. The display device includes a display member and a collision predictor. The collision predictor detects one or more moving bodies on and around a course of the vehicle, and predicts collision of the vehicle with the one or more moving bodies detected, and a position of the collision. The display member displays a collision-position mark at a display position in a visual field of a driver, on a condition that the collision of the vehicle with any one of the one or more moving bodies is predictable. The display position is superimposed on the predicted position of the collision. The display member displays a delineator mark that associates the collision-position mark with the relevant one of the one or more moving bodies detected.

12 Claims, 5 Drawing Sheets

(58) Field of Classification Search
CPC .... G08G 1/167; G08G 1/168; B60R 2300/20; B60R 2300/202; B60R 2300/207; B60R 2300/301; B60R 2300/304; B60R 2300/305; B60R 2300/306; B60R 2300/307; B60R 2300/308; B60R 2300/802; B60R 2300/804; B60R 2300/806; B60R 2300/8066; B60R 2300/8086; G06K 9/0079; G06K 9/00798; G06K 9/00805
See application file for complete search history.

(56) References Cited

U.S. PATENT DOCUMENTS

| | | | |
|---|---|---|---|
| 9,516,275 B2 * | 12/2016 | Okano | B60R 1/00 |
| 9,799,132 B2 * | 10/2017 | Okano | B60R 1/00 |
| 2010/0020169 A1 * | 1/2010 | Jang | G01C 21/36 |
| | | | 348/115 |
| 2017/0330463 A1 * | 11/2017 | Li | G08G 1/166 |

* cited by examiner

DISPLAY DEVICE FOR VEHICLE

CROSS-REFERENCE TO RELATED APPLICATIONS

The present application claims priority from Japanese Patent Application No. 2016-164556 filed on Aug. 25, 2016, the entire contents of which are hereby incorporated by reference.

BACKGROUND

The technology relates to a display device for a vehicle.

In a vehicle such as an automobile, a driver is seated on a driver's seat in a passenger room, and operates a steering wheel, an accelerator pedal, or a brake pedal, or other equipment, to drive the vehicle.

For purposes of reduction in a burden on the driver, the vehicle provides display of route guidance on a liquid crystal display, or adopts a drive assistance system, as described in Japanese Unexamined Patent Application Publication (JP-A) No. 2007-263839.

SUMMARY

However, safety of the travel of the vehicle basically depends on carefulness and an evasive action of the driver who drives the vehicle.

Accordingly, the driver is requested to check by themselves a traveling direction of the vehicle during the travel, to sense possibility of a collision with another vehicle or a person, and to take a necessary evasive action, even if automatic operation is being performed.

Thus, in the vehicle, it is requested to give warning for early recognition of a moving body that is moving on and around the course of the vehicle.

An aspect of the technology provides a display device for a vehicle. The display device includes a display member and a collision predictor. The display member is configured to display an image on a front windshield or a screen. The front windshield or the screen is see-through enough to allow a driver to visually check in a traveling direction of the vehicle. The driver is seated on a driver's seat of the vehicle and operates the vehicle. The collision predictor is configured to detect one or more moving bodies on and around a course of the vehicle, and predicts collision of the vehicle with the one or more moving bodies detected, and a position of the collision. The display member displays a collision-position mark at a display position in a visual field of the driver who faces the traveling direction, on the condition that the collision of the vehicle with any one of the one or more moving bodies is predictable. The display position is superimposed on the position of the collision predicted by the collision predictor. The display member displays a delineator mark that associates the collision-position mark with the relevant one of the one or more moving bodies detected.

The display member may display the delineator mark from the display position of the collision-position mark to a display position superimposed on the relevant one of the one or more moving bodies detected.

The display member may display the delineator mark after displaying the collision-position mark.

The collision predictor may repetitively predict the collision of the vehicle with the one or more moving bodies. The display member may stop displaying the collision-position mark and the delineator mark with respect to the relevant one of the one or more moving bodies, on the condition that evasive operations including a course change have been carried out, or on the condition that possibility of the collision has diminished or disappeared.

The one or more moving bodies may include a plurality of moving bodies. The display member may display the delineator mark with respect to a closest one of the plurality of the moving bodies, on the condition that the collision with the plurality of the moving bodies is predictable.

DETAILED DESCRIPTION

In the following, some implementations of the technology are described with reference to the drawings. The implementations describe cases where a driver's seat is provided on the right side in a vehicle compartment, in a traffic system whereby vehicles move on the left side of a road.

Figure 1:
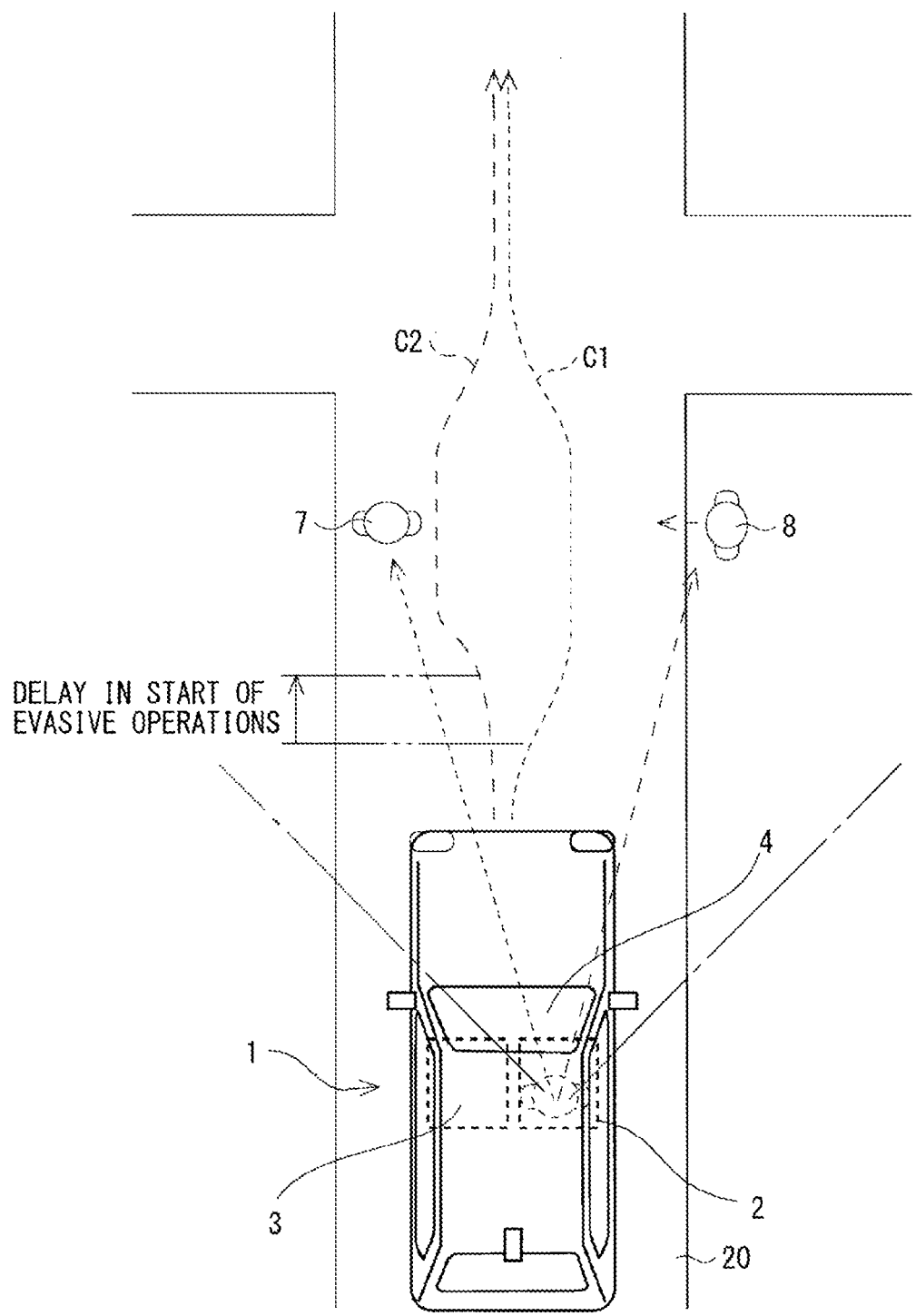
FIG. 1 illustrates one example of an automobile according to an implementation of the technology, and its traveling environment.

FIG. 1 illustrates an automobile 1 according to an implementation of the technology, and its traveling environment. FIG. 1 gives an example of a case of left-hand traffic.

The automobile 1 may serve as one example of a vehicle according to an implementation of the technology. In the example in FIG. 1, the automobile 1 may be traveling on a road 20 having a small width, from below upwards in the figure. A driver's seat 2 of the automobile 1 may be offset rightward in the automobile 1. A navigator's seat 3 may be disposed on left side of the driver's seat 2.

A driver may be seated on the driver's seat 2, and check frontward in a traveling direction, through a front windshield 4, with a visual field denoted by an alternate dot and dash line in the figure. The driver is expected to catch sight of a moving body such as a pedestrian, to determine possibility of collision on the basis of a motion of the moving body, and to take a necessary evasive action, by themselves.

For example, let us assume that a person 7 is walking on left side of a course on the road 20 on which the automobile 1 is traveling. In this case, the driver can recognize a movement of the person 7 as a movement obliquely left frontward. In a case where the driver senses the possibility of the collision on the basis of the motion of the person 7, the driver may turn the steering wheel 5 to right to avoid the collision. In FIG. 1, an evasive course is denoted by a fine broken line C1.

As another example, let us assume that a person 8 is going to step down to the road 20 from the right side of the course on the road 20 on which the automobile 1 is traveling. In this case, the driver can recognize the movement of the person 8 as a movement obliquely right frontward. In the case where the driver senses the possibility of the collision on the basis of the motion of the person 8, the driver may turn the steering wheel 5 to left to avoid the collision. In FIG. 1, the evasive course is denoted by a rough broken line C2.

In the following, the term "on the left side of the course" is also referred to as "on navigator's-seat-3 side", i.e., on side on which the navigator's seat 3 is disposed. The term "on the right side of the course" is also referred to as "on driver's-seat-2 side", i.e., on side on which the driver's seat 2 is disposed.

Figures 2, 3:
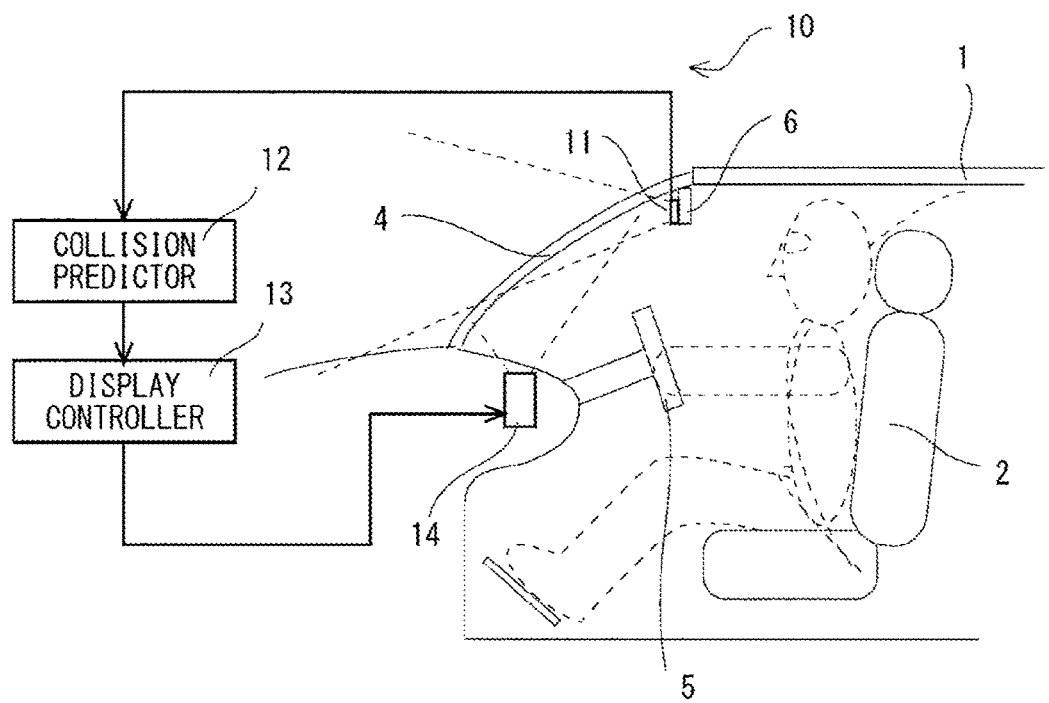
FIG. 2 illustrates a display device according to the implementation.
FIG. 3 illustrates how to display in accordance with visual lines of a driver.

FIG. 2 illustrates a display device 10 according to this implementation. The display device 10 may be mounted on the automobile 1.

Referring to FIG. 2, the display device 10 for the automobile 1 may include a detection member 11, a collision predictor 12, a display controller 13, and a display member 14. The collision predictor 12 and the display controller 13 may each include, for example, a microcomputer.

The display member 14 may be, for example, a projector 15 that projects a picture on the front windshield 4. The front windshield 4 may be either transparent or semi-transparent as long as the front windshield 4 is see-through enough to allow the driver who operates the automobile 1 to visually check in the traveling direction.

In one alternative, the display member 14 may be, for example, a head mount display provided around the driver's seat 2. The head mount display may include a transparent or semi-transparent screen provided between, for example but not limited to, the head of the driver and the front windshield 4. The head mount display may project or display the picture on the screen.

FIG. 3 illustrates how to display in accordance with visual lines of the driver.

As illustrated in FIG. 3, the projector 15 may project the picture on the front windshield 4. In this case, in order to display an image on superimposed relation to a point P1 on the course of the automobile 1, the projector 15 may display an image at a display position P2 on the front windshield 4. Thus, the image displayed on the display position P2 may be displayed in the superimposed relation to the point P1 on the course.

The detection member 11 may be, for example but not limited to, a semiconductor imaging device. The detection member 11 may be disposed in a frontward-directed orientation, for example, on front side of a rear-view mirror 6, in a passenger room of the automobile 1. This makes it possible for the detection member 11 to capture images in the traveling direction of the automobile 1. The detection member 11 may output the images thus captured to the collision predictor 12.

The collision predictor 12 detects, on the basis of the images captured by the detection member 11, a moving body on and around the course of the automobile 1, in particular, the moving body on the driver's-seat-2 side, and predicts possibility of collision of the automobile 1 with the moving body, and a position of the collision.

In order to detect a movement of the moving body, the collision predictor 12 may superimpose a plurality of the images that are temporarily successively captured, with their backgrounds superposed on one another, and detect the moving body as differences between the plurality of the images thus superposed on one another. Moreover, the collision predictor 12 may calculate a relative direction and a relative distance of the moving body with reference to the automobile 1, on the basis of positions of the moving body detected in the images. For example, in a case where the images of an identical range are captured by a pair of the semiconductor imaging devices arranged side by side in a right-and-left direction on the front side of the rear-view mirror 6, it is possible to calculate the relative direction and the relative distance of the moving body, by triangulation, on the basis of differences of the positions of the moving body captured in the images. This makes it possible to detect presence or absence of the moving body on and around the course of the automobile 1. It is also possible, if the presence of the moving body is detected, to detect presence or absence of the movement of the moving body.

In order to predict the collision with the moving body, the collision predictor 12 may calculate the presence or the absence of the movement of the moving body, a direction of the movement, and a speed of the movement, on the basis of changes in the relative direction and the relative distance of the identical moving body that is temporarily successively detected. Moreover, the collision predictor 12 may predict the possibility of the collision, on the basis of a movement of the automobile 1 and the movement of the moving body. For example, the collision predictor 12 may determine whether or not a predicted path of the movement of the moving body is going to cross a predicted path of the movement of the automobile 1. Furthermore, in a case where the predicted paths are going to cross each other, the collision predictor 12 may calculate a time zone when the moving body passes through a position at which the predicted paths are going to cross, and calculate a time zone when the automobile 1 passes through the position at which the predicted paths are going to cross. In a case with overlap between the time zones, the collision predictor 12 may determine presence of the possibility of the collision.

The display controller 13 may be coupled to the collision predictor 12. The display controller 13 may allow, on the basis of information generated by the collision predictor 12, the display member 14 to display necessary information.

For example, let us assume that the collision of the automobile 1 with the moving body is predictable at the point P1 in FIG. 3. In this case, the display controller 13 may allow the display member 14 to provide warning display at the display position P2 on the front windshield 4. This makes it possible, in a case where the collision with the moving body is predictable, to display the necessary information in association with the point P1 at which the collision is predictable, in the visual field of the driver who faces the traveling direction.

Figure 4:
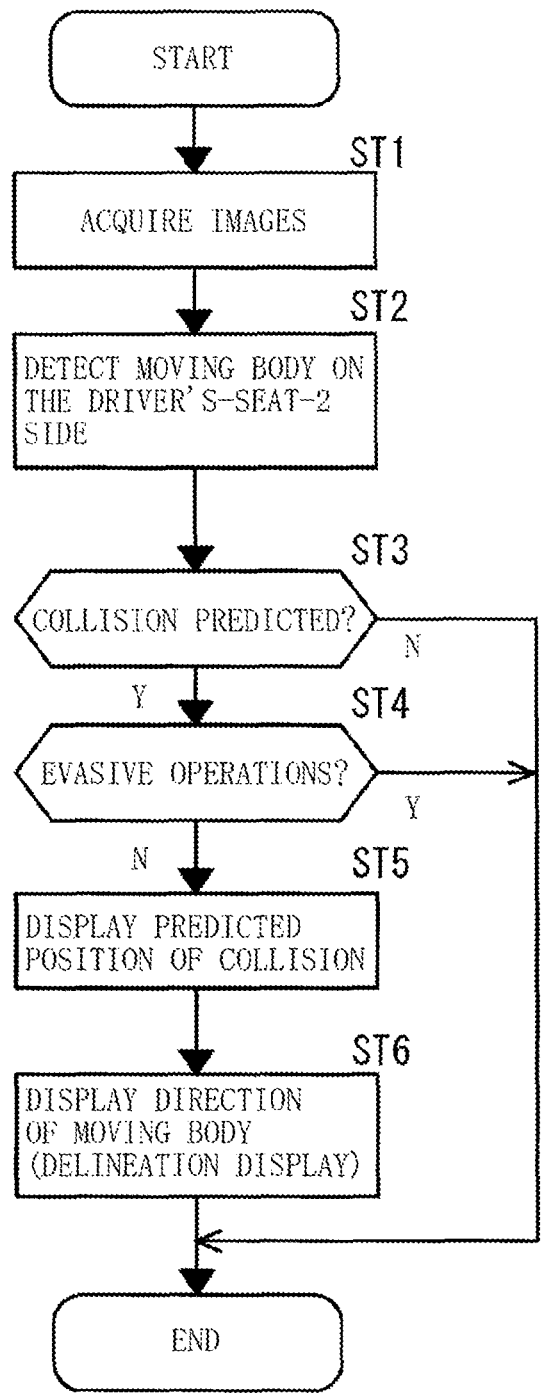
FIG. 4 is a flowchart of a warning display control by the display device illustrated in FIG. 2.

FIG. 4 is a flowchart of a warning display control by the display device illustrated in FIG. 2.

The display device 10 illustrated in FIG. 2 may repetitively execute the warning display control illustrated in FIG. 4 during travel of the automobile 1.

In the warning display control illustrated in FIG. 4, first, the collision predictor 12 may acquire latest images from the detection member 11 (step ST1).

The collision predictor 12 detects, on the basis of the images captured, the moving body on and around the course of the automobile 1 (step ST2), and predicts the possibility of the collision of the automobile 1 with the moving body, and the position of the collision.

Thereafter, the display controller 13 may determine whether or not the collision predictor 12 has predicted the collision of the automobile 1 with the moving body (step ST3).

In a case where the collision predictor 12 has predicted the collision (Y in step ST3), the display controller 13 may further determine whether or not evasive operations have been carried out by the driver to avoid the collision (step ST4).

Meanwhile, in a case where the collision predictor 12 has not predicted the collision (N in step ST3), or in a case where the evasive operations have been already carried out (Y in step ST4), the display controller 13 may end the processing in FIG. 4.

Thus, in the case where the evasive operations including a course change have been carried out to avoid uncertainties, or in the case where the possibility of the collision have diminished or disappeared, the warning display control by the display controller 13 as described later may be kept from being executed. Display of a collision-position mark 21 and a delineator mark 22 described later may be stopped.

In contrast, in a case where the collision is predictable (Y in step ST3) and the evasive operations have not been carried out (N in step ST4), the display controller 13 may execute the warning display control.

In the warning display control, first, the display controller 13 may display the collision-position mark 21 at a display position superimposed on a predicted position of the collision on the course (step ST5).

In this example, the collision-position mark 21 may be displayed solely with respect to the moving body on the driver's-seat-2 side.

Thereafter, the display controller 13 may display the delineator mark 22 from the display position of the collision-position mark 21 toward a display position superimposed on the moving body with which the collision is predictable (step ST6).

With the display as described above, it is possible to guide the visual lines and consciousness of the driver toward the moving body with which the collision is predictable. This makes it possible for the driver to recognize a point at which the collision of the automobile 1 with the moving body is predictable, and to recognize the moving body with which the collision at the point is predictable.

It is to be noted that the delineator mark 22 may be displayed from the moving body with which the collision is predictable toward the display position of the collision-position mark 21.

FIGS. 5A to 5D illustrate one example of a change in display by the warning display control illustrated in FIG. 4.

Figure 5A:
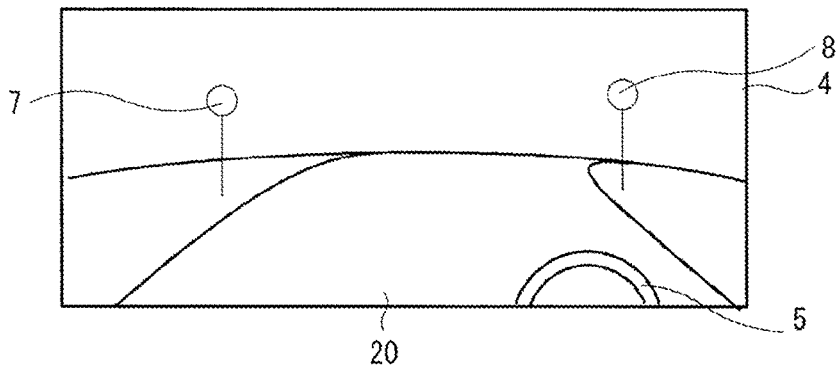
FIGS. 5A to 5D illustrate one example of a change in display by the warning display control in FIG. 4.

As illustrated in FIG. 5A, pedestrians, e.g., the person 7 and the person 8, are seen to be moving on right and left road shoulders, in a region of the front windshield 4 corresponding to the visual field of the driver.

In this case, the collision predictor 12 predicts the collision with the moving body on and around the course of the automobile 1, and the position of the collision.

Figure 5B:
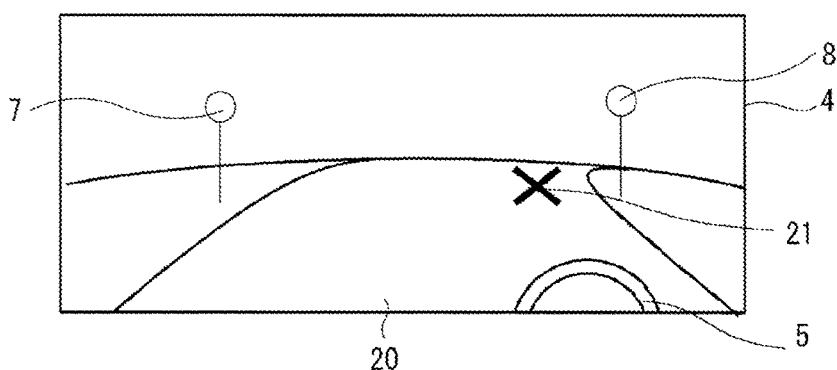

As illustrated in FIG. 5B, the display controller 13 displays the collision-position mark 21 at the predicted position of the collision. In this example, the collision-position mark 21 may be an X mark, but the collision-position mark 21 may take any other form that is able to indicate the predicted position of the collision.

Figure 5C:
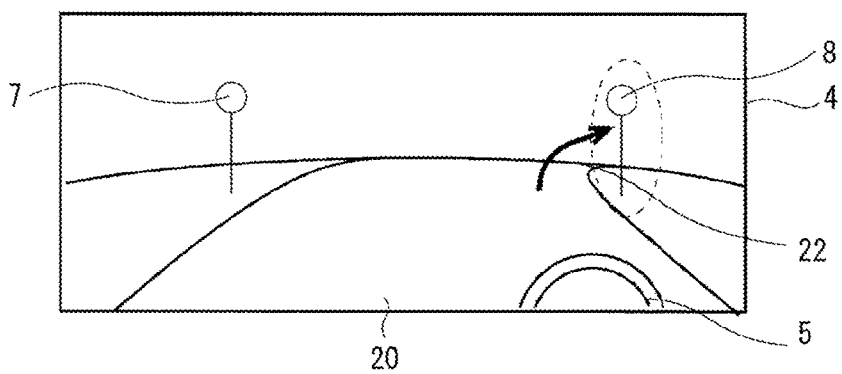

As illustrated in FIG. 5C, after displaying the collision-position mark 21, the display controller 13 may display the delineator mark 22 from the display position of the collision-position mark 21 toward the pedestrian, i.e., the person 8. In this example, the delineator mark 22 may be an arrow or an arrowed line, but the delineator mark 22 may take any other form that is able to associate the collision-position mark 21 with the moving body. The delineator mark 22 may be either a continuous line or a discontinuous line.

With the display as described above, it is possible for the driver to recognize the point at which the collision with the pedestrian or the person 8 is predictable, and the pedestrian or the person 8 with whom the collision at the point is predictable. This makes it possible for the driver to promptly take the evasive action to avoid the collision.

Figure 5D:
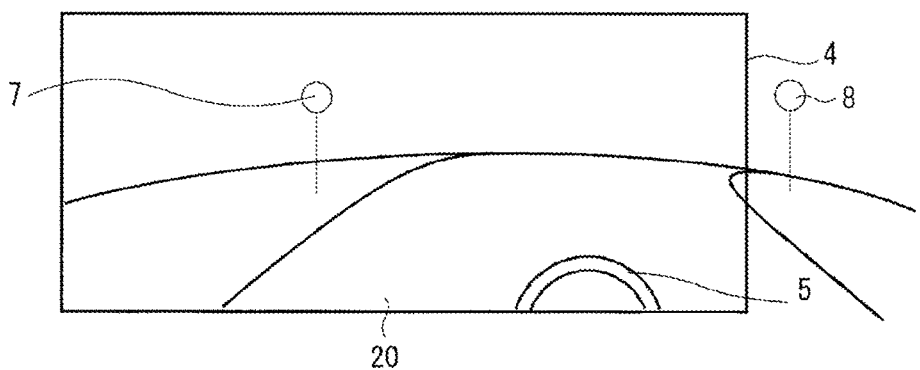

As a result, as illustrated in FIG. 5D, the driver may turn the steering wheel 5 to the left, causing the course of the automobile 1 to shift leftward. The pedestrian or the person 8 with whom the collision has been predictable comes out of the course. Thus, the collision is avoided. The display controller 13 may stop the warning display of the collision-position mark 21 and the delineator mark 22.

FIGS. 6A to 6D illustrate another example of the change in the display by the warning display control illustrated in FIG. 4.

Figure 6A:
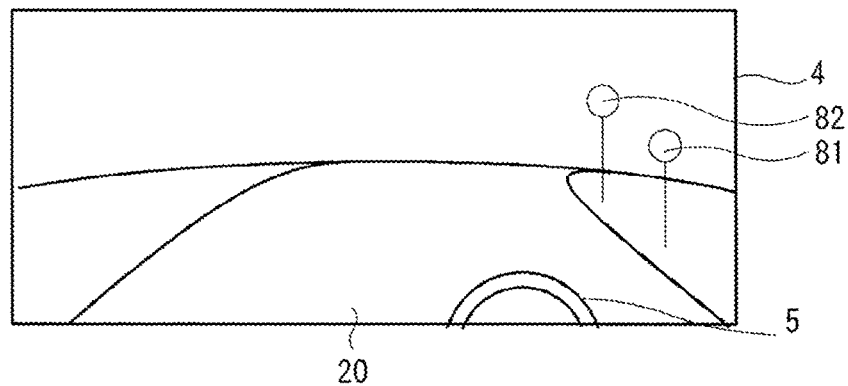
FIGS. 6A to 6D illustrate another example of the change in the display by the warning display control in FIG. 4.

As illustrated in FIG. 6A, a plurality of the pedestrians, e.g., a person 81 and a person 82, are seen to be moving on the right road shoulder, in the region of the front windshield 4 corresponding to the visual field of the driver.

In this case, the collision predictor 12 predicts the collision with the plurality of the moving bodies on and around the course of the automobile 1, and the positions of the collision.

Figure 6B:
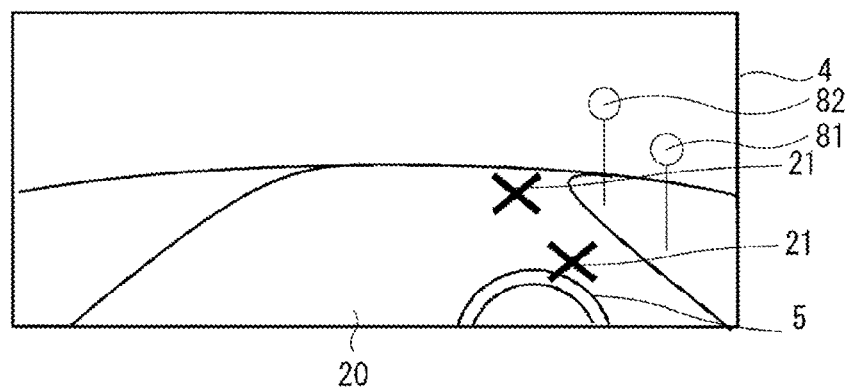

As illustrated in FIG. 6B, the display controller 13 displays the collision-position marks 21 at a plurality of the predicted positions of the collision.

Figure 6C:
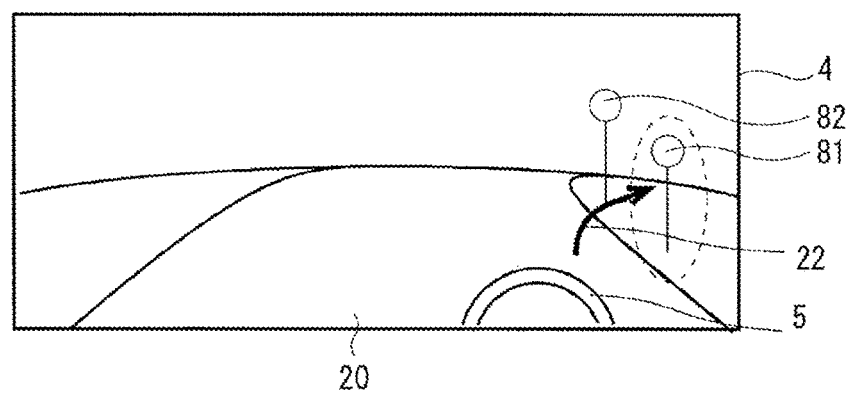

As illustrated in FIG. 6C, after displaying the collision-position marks 21, the display controller 13 may display the delineator mark 22 from a closest one of the display positions of the collision-position marks 21 at which the collision is predictable, toward the relevant one of the pedestrians.

With the display as described above, it is possible for the driver to recognize the points at which the collision with the plurality of the pedestrians, i.e., the person 81 and the person 82, is predictable, and the pedestrian, i.e., the person 81, with whom the collision at the closest point is predictable. This makes it possible for the driver to promptly take the collision-evasive action.

Figure 6D:
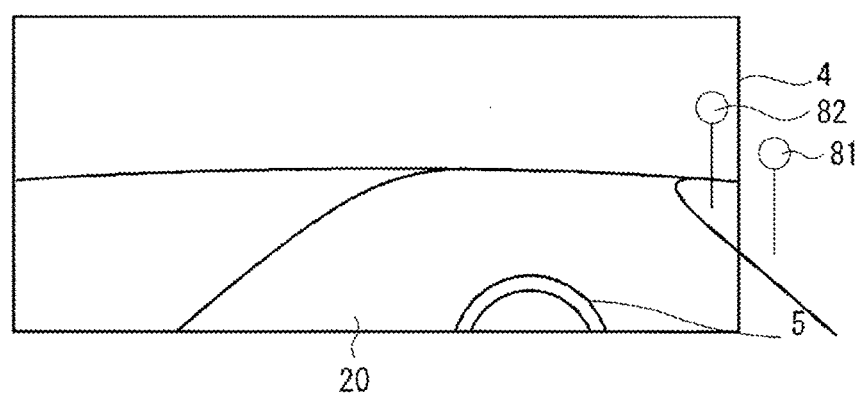

As a result, for example, as illustrated in FIG. 6D, the driver may turn the steering wheel 5 to the left, causing the course of the automobile 1 to shift leftward. The pedestrian or the person 81 with whom the collision has been predictable comes out of the course. Thus, the collision is avoided. The display controller 13 may stop the warning display of the collision-position mark 21 and the delineator mark 22.

As described, in this implementation, the moving body on and around the course of the automobile 1 is detected. In the case where the collision with the moving body is predictable, the collision-position mark 21 is displayed at the display position superimposed on the predicted position of collision, and the delineator mark 22 is displayed from the display position of the collision-position mark 21 toward the display position superimposed on the moving body detected, in the visual field of the driver who faces the traveling direction. Hence, it is possible to provide emphasized display of the predicted position of the collision and of the moving body detected, on the front windshield 4. The front windshield 4 is see-through enough to allow the driver who operates the automobile 1 to visually check in the traveling direction.

With the display as described above, it is possible for the driver to early recognize the moving body moving on and around the course of the automobile 1. It is possible to easily recognize the moving body moving on and around the course of the automobile 1, and to promptly take the necessary evasive action. Moreover, in this implementation, not only the predicted position of the collision is indicated by the collision-position mark 21, but also displayed is the delineator mark 22 that associates the predicted position of the collision, with the moving body with whom the collision is predictable at the predicted position of the collision.

Hence, it is possible for the driver to grasp a future motion of the moving body, and to easily take the appropriate evasive action.

Furthermore, as illustrated in FIG. 5, it is the moving body solely on the driver's-seat-2 side of the course of the automobile 1 that is subjected to the emphasized display. This saves performing the emphasized display of a number of the moving bodies. Hence, it is possible to restrain the number of the moving bodies subjected to the emphasized display, and to concentrate the attention of the driver to the emphasized display.

In contrast, for example, if the moving body as illustrated in a left region of FIG. 5 were also subjected to the emphasized display, it is likely that the emphasized display would be provided at a plurality of positions over the whole visual field of the driver. In this case, the attention of the driver would be distracted between the emphasized display on the driver's-seat-2 side and the emphasized display on the navigator's-seat-3 side. In this implementation, it is possible to suitably restrain such a situation.

In addition, in this implementation, the collision-position mark 21 may be displayed, and thereafter, the delineator mark 22 may be displayed. Accordingly, it is possible for the driver to recognize, first, the predicted position of the collision, to recognize, thereafter, the moving body, and to recognize how to avoid the collision, e.g., a direction to avoid the collision. Shifting timing of information display makes it possible to provide display in accordance with priority of information.

In contrast, for example, if the collision-position mark 21 and the delineator mark 22 were displayed simultaneously, the driver would be forced to identify the collision-position mark 21 and the delineator mark 22 in the warning display on display. This would take the driver longer time to understand the situation. Not to mention, a mistake in decision would cause possibility of a failure in avoiding the collision appropriately.

Moreover, in this implementation, the prediction of the collision with the moving body may be repetitively performed. In the case where the evasive operations including the course change have been carried out to avoid the uncertainties, or in the case where the possibility of the collision have diminished or disappeared, the display of the collision-position mark 21 and the delineator mark 22 may be stopped. Hence, it is possible to keep the collision-position mark 21 and the delineator mark 22 from being continuously on display after the evasive operations. It is possible to early relieve the visual field and the attention of the driver.

Furthermore, in this implementation, in the case where the collision of the automobile 1 with the plurality of the moving bodies is predictable on and around the course of the automobile 1, the delineator mark 22 may be displayed solely the with respect to the closest one to the automobile 1 out of the plurality of the moving bodies. Hence, it is possible for the driver to recognize the plurality of the moving bodies on and around the course of the automobile 1, and to easily determine a direction to avoid the collision with the closest one of the plurality of the moving bodies. It is possible to take appropriate measures to avoid the collision.

In contrast, for example, if a plurality of the delineator marks 22 were displayed with respect to all the plurality of the moving bodies, the driver would analyze complicated display, make a decision, and thereafter, take the evasive action. In this case, there would be possibility of difficulties in taking the evasive action promptly and appropriately with respect to the closest one of the plurality of the moving bodies. There would also be possibility of difficulties in taking the evasive action reflexively, immediately in response to the display of the delineator mark 22.

Although some implementations of the technology have been described in the foregoing by way of example with reference to the accompanying drawings, the technology is by no means limited to the implementations described above. It should be appreciated that various modifications and alterations may be made without departing from the scope as defined by the appended claims, and the technology is intended to include such modifications and alterations.

In one implementation described above, the collision predictor 12 and the display controller 13 illustrated in the figures such as FIG. 2 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the collision predictor 12 and the display controller 13. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in the figures such as FIG. 2.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A display device for a vehicle, comprising:
    a display member configured to display an image on a front windshield or a screen located between a head of a driver and the front windshield, the front windshield or the screen being see-through enough to allow the driver to visually view an outside of the vehicle through the front windshield or the screen in a traveling direction of the vehicle, and the driver being seated on a driver's seat of the vehicle and operating the vehicle;
    a collision predictor configured to detect one or more moving bodies on and around a course of the vehicle, and predicts collision of the vehicle with the one or more moving bodies detected, and a position of the collision,
    a display controller that controls the display member to display on a basis of information generated by the collision predictor to necessary information,
    wherein the display controller sets a collision-position mark at a display position superimposed on a predicted position of the collision on the course of the vehicle on a condition that the collision of the vehicle with one of the one or more moving bodies is predictable and sets a delineator mark which is from the display position of the collision-position mark toward the display position of the detected one or more moving bodies at a display position superimposed on the moving body, wherein the display member displays, on the basis of information generated by the display controller, the collision-position mark at a display position in a visual field of the driver who faces the traveling direction, and wherein the delineator mark associates the collision-position mark with a relevant one of the one or more moving bodies detected.

2. The display device for the vehicle according to claim 1, wherein the display member displays the delineator mark after displaying the collision-position mark.

3. The display device for the vehicle according to claim 2, wherein the collision predictor repetitively predicts the collision of the vehicle with the one or more moving bodies, and wherein the display member stops displaying the collision-position mark and the delineator mark with respect to the relevant one of the one or more moving bodies, on a condition that evasive operations including a course change have been carried out, or on a condition that possibility of the collision has diminished or disappeared.

4. The display device for the vehicle according to claim 3, wherein the one or more moving bodies include a plurality of moving bodies, and wherein the display member displays the delineator mark with respect to a closest one of the plurality of the moving bodies, on a condition that the collision with the plurality of the moving bodies is predictable.

5. The display device for the vehicle according to claim 2, wherein the one or more moving bodies include a plurality of moving bodies, and wherein the display member displays the delineator mark with respect to a closest one of the plurality of the moving bodies, on a condition that the collision with the plurality of the moving bodies is predictable.

6. The display device for the vehicle according to claim 1, wherein the collision predictor repetitively predicts the collision of the vehicle with the one or more moving bodies, and wherein the display member stops displaying the collision-position mark and the delineator mark with respect to the relevant one of the one or more moving bodies, on a condition that evasive operations including a course change have been carried out, or on a condition that possibility of the collision has diminished or disappeared.

7. The display device for the vehicle according to claim 6, wherein the one or more moving bodies include a plurality of moving bodies, and wherein the display member displays the delineator mark with respect to a closest one of the plurality of the moving bodies, on a condition that the collision with the plurality of the moving bodies is predictable.

8. The display device for the vehicle according to claim 1, wherein the one or more moving bodies include a plurality of moving bodies, and wherein the display member displays the delineator mark with respect to a closest one of the plurality of the moving bodies, on a condition that the collision with the plurality of the moving bodies is predictable.

9. The display device for the vehicle according to claim 1, wherein the display member displays the image on the front windshield.

10. The display device for the vehicle according to claim 1, wherein the delineator mark comprises a line displayed on the display member.

11. The display device for the vehicle according to claim 10, wherein the line of the delineator mark extends from the display position of the collision-position mark toward a display position superimposed on the relevant one of the one or more moving bodies detected including one or more pedestrians or persons.

12. The display device for the vehicle according to claim 1, wherein the display member includes a projector that projects the image on the front windshield.

* * * * *